(12) United States Patent
Du

(10) Patent No.: US 10,521,971 B2
(45) Date of Patent: Dec. 31, 2019

(54) METHOD AND APPARATUS FOR MARKING AND DISPLAYING SPATIAL SIZE IN VIRTUAL THREE-DIMENSIONAL HOUSE MODEL

(71) Applicant: KE.COM (BEIJING) TECHNOLOGY CO., LTD., Beijing (CN)

(72) Inventor: Xing Du, Beijing (CN)

(73) Assignee: KE.COM (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/426,248

(22) Filed: May 30, 2019

(65) Prior Publication Data

US 2019/0371079 A1 Dec. 5, 2019

(30) Foreign Application Priority Data

May 30, 2018 (CN) .......................... 2018 1 0540683
May 30, 2018 (CN) .......................... 2018 1 0540813

(51) Int. Cl.
*G06T 19/20* (2011.01)
*G06T 15/00* (2011.01)
(Continued)

(52) U.S. Cl.
CPC ............ *G06T 19/20* (2013.01); *G06T 15/005* (2013.01); *G06T 17/10* (2013.01); *G06T 19/003* (2013.01);
(Continued)

(58) Field of Classification Search
CPC ........ G06T 19/20; G06T 15/005; G06T 17/10
(Continued)

(56) References Cited

U.S. PATENT DOCUMENTS

| 7,523,411 B2 * | 4/2009 | Carlin ................... G06Q 30/02 345/419 |
| 8,010,906 B1 * | 8/2011 | Sinnard .................. G06Q 10/06 715/771 |

(Continued)

FOREIGN PATENT DOCUMENTS

| CN | 1292130 A | 4/2001 |
| CN | 104850587 A | 8/2015 |

(Continued)

OTHER PUBLICATIONS

Lun, Elements of Style: Learning Perceptual Shape Style Similarity, ACM Transactions on Graphics, vol. 34, No. 4, Article 84, Publication Date: Aug. 2015 (Year: 2015).*

(Continued)

*Primary Examiner* — Hai Tao Sun
(74) *Attorney, Agent, or Firm* — Veros Legal Solutions LLP

(57) ABSTRACT

The present disclosure provides a method and an apparatus for automatically generating and displaying a relevant dimension in a virtual three-dimensional house model. The method includes: acquiring a plane layout and a three-dimensional house model of a single house; aligning a top view or a cross-sectional view of the three-dimensional house model with the plane layout to obtain a correspondence relationship between a unit length of the three-dimensional house model and a unit pixel of the plane layout; calculating a real length corresponding to the unit length of the three-dimensional house model according to the correspondence relationship; and calculating a real dimension of a room and/or an object in the house according to the real length corresponding to the unit length of the three-dimensional house model for the purpose of presentation.

14 Claims, 6 Drawing Sheets

(51) Int. Cl.
*G06T 17/10* (2006.01)
*G06T 19/00* (2011.01)

(52) U.S. Cl.
CPC ..... *G06F 2203/04808* (2013.01); *G06T 2215/16* (2013.01); *G06T 2219/012* (2013.01); *G06T 2219/028* (2013.01); *G06T 2219/2004* (2013.01)

(58) Field of Classification Search
USPC .......................................................... 345/419
See application file for complete search history.

(56) References Cited

U.S. PATENT DOCUMENTS

| | | | | |
|---|---|---|---|---|
| 9,449,342 | B2* | 9/2016 | Sacco | G06T 19/006 |
| 2001/0018644 | A1* | 8/2001 | Schwalb | G06T 19/00 |
| | | | | 703/7 |
| 2002/0010734 | A1* | 1/2002 | Ebersole | H04L 29/06 |
| | | | | 709/201 |
| 2002/0107674 | A1* | 8/2002 | Bascle | G06F 3/011 |
| | | | | 703/1 |
| 2008/0151216 | A1* | 6/2008 | Schiavi | G01C 15/002 |
| | | | | 356/3 |
| 2014/0285522 | A1* | 9/2014 | Kim | G06T 19/006 |
| | | | | 345/633 |
| 2018/0012411 | A1* | 1/2018 | Richey | G06T 7/73 |
| 2018/0143756 | A1 | 5/2018 | Mildrew et al. | |

FOREIGN PATENT DOCUMENTS

| | | |
|---|---|---|
| CN | 106991723 A | 7/2017 |
| CN | 107168672 A | 9/2017 |
| CN | 108765583 A | 11/2018 |
| CN | 108961417 A | 12/2018 |

OTHER PUBLICATIONS

Inside Houzz: Introducing 'View in My Room' retrieved Apr. 20, 2017 from https://www.houzz.com/deabooks/61877912/list/inside-houzz-introducing-view-in-my-room (Year: 2017).*
AnJuKe App; http://www.962.net/azgame/239338.html (screenshots provided).
Online Article: "200 million RMB investment in two years, KE intends to utilize VR technology in the real estate" downloaded Sep. 11, 2019. http://www.sohu.com/a/232064796_549351.

* cited by examiner

METHOD AND APPARATUS FOR MARKING AND DISPLAYING SPATIAL SIZE IN VIRTUAL THREE-DIMENSIONAL HOUSE MODEL

TECHNICAL FIELD

The present disclosure relates to the field of virtual reality technologies, in particular to a method and an apparatus for marking and displaying a spatial size in a virtual three-dimensional house model.

BACKGROUND ART

With the development of virtual reality (VR) technologies, the VR technologies are applied in increasingly more industries to display business-relevant images more vividly and realistically.

For example, in a VR house viewing system in the industry of real estate agency, when a user enters a virtual three-dimensional house model, for an object in a space, the user only can get information on shape and rough volume in the space, but cannot precisely perceive a specific dimension of the object. For users, however, the specific dimensional information on the object is particularly important. For example, for a sofa a user sees in a three-dimensional space, the user might want to know the sofa's length and width, so as to determine how it will look if the sofa in his/her own home is placed here, and how much space the sofa will take. Or when seeing a certain room, the user might want to know the room's length and width, so as to determine dimensions of furniture such as bed, cabinet and sofa suitable to this room.

Therefore, how to reasonably demonstrate a spatial size marking so as to more intuitively and more clearly indicate a spatial size of a real room and thereby improve immersive experience of users becomes a problem that needs to be addressed.

SUMMARY

One object of the present disclosure is to provide a method and an apparatus for automatically generating a relevant dimension in a virtual three-dimensional house model, and to provide a method and an apparatus for displaying a spatial size marking in a virtual three-dimensional house model.

According to one aspect of the present disclosure, a method for automatically generating a relevant dimension in a virtual three-dimensional house model is provided, including: acquiring a plane layout and a three-dimensional house model of a single house; aligning a top view or a cross-sectional view of the three-dimensional house model with the plane layout to obtain a correspondence relationship between a unit length of the three-dimensional house model and a unit pixel of the plane layout; calculating a real length corresponding to the unit length of the three-dimensional house model according to the correspondence relationship; and calculating a real dimension of a room and/or an object in the house according to the real length corresponding to the unit length of the three-dimensional house model.

According to another aspect of the present disclosure, a method for displaying a spatial size marking of a real room dimension in a virtual three-dimensional house model is provided, including: receiving a request sent by a terminal after detecting a trigger action for displaying a virtual scene; and acquiring a range of field of view of virtual human eyes viewing the virtual scene, wherein the request carries information on the virtual scene, and wherein the virtual scene is an indoor scene in the virtual three-dimensional house model; according to the preceding method, acquiring a real room dimension corresponding to the indoor scene in the virtual three-dimensional house model; determining whether to display a spatial size marking at the terminal according to the real room dimension and a visible part of the real room dimension in the range of field of view, wherein the spatial size marking is corresponding to the real room dimension; and sending, if it is determined to display the spatial size marking at the terminal, a display instruction for the spatial size marking to the terminal, so as to allow the terminal to display the spatial size marking.

According to a further aspect of the present disclosure, an apparatus for automatically generating a relevant dimension in a virtual three-dimensional house model is provided, including: an acquisition unit, configured to acquire a plane layout and a three-dimensional house model of a single house; an alignment unit, configured to align a top view or a cross-sectional view of the three-dimensional house model with the plane layout; a first calculation unit, configured to calculate a correspondence relationship between a unit length of the three-dimensional house model and a unit pixel of the plane layout; a second calculation unit, configured to calculate a real length corresponding to the unit length of the three-dimensional house model according to the correspondence relationship; and a third calculation unit, configured to calculate a real dimension of a room and/or an object in the house according to the real length corresponding to the unit length of the three-dimensional house model.

According to a further aspect of the present disclosure, an apparatus for displaying a spatial size marking of a real room dimension in a virtual three-dimensional house model is further provided, including: the preceding apparatus, configured to acquire a real room dimension corresponding to an indoor scene in the virtual three-dimensional house model; a receiving unit, configured to receive a request sent by a terminal after detecting a trigger action for displaying a virtual scene, and acquire a range of field of view of virtual human eyes viewing the virtual scene, wherein the request carries information on the virtual scene, and wherein the virtual scene is the indoor scene in the virtual three-dimensional house model; a determining unit, configured to determine whether to display a spatial size marking at the terminal according to the real room dimension and a visible part of the real room dimension in the range of field of view, wherein the spatial size marking is corresponding to the real room dimension; and a sending unit, configured to send, if it is determined to display the spatial size marking at the terminal, a display instruction for the spatial size marking to the terminal, so as to allow the terminal to display the spatial size marking.

According to the present disclosure, a computer program medium for implementing the above method is further provided.

More features and advantages of the present disclosure will become clear from exemplary embodiments below in connection with the figures.

BRIEF DESCRIPTION OF DRAWINGS

In order to more clearly illustrate technical solutions in embodiments of the present invention or the prior art, figures which need to be used for description of the embodiments or the prior art will be introduced briefly below. Apparently, the figures in the following description show some embodi

DETAILED DESCRIPTION OF EMBODIMENTS

In order to make the objects, technical solutions and advantages of the embodiments of the present invention clearer, the technical solutions in the embodiments of the present invention will be described clearly and completely below in connection with the figures in the embodiments of the present invention.

Apparently, some but not all embodiments of the present invention are described. Based on the embodiments in the present invention, all other embodiments obtained by those ordinarily skilled in the art, without using creative effort, fall within the scope of protection of the present invention. Before detailed introduction to the contents provided in the present invention, first the meaning of the concept "VR house viewing" is given.

Different from currently popular house viewing concepts such as picture house viewing, video house viewing, and panoramic house viewing that fail to provide depth information and real perception, "VR house viewing" refers to real representation of a three-dimensional scene of houses utilizing the VR technologies, to provide consumers immersive house viewing experience in a free mode, such that users can experience a real house viewing scene without going outdoors. For example, by opening a VR house in an APP, depth information such as dimensions, orientations, and distances of a real house space can be obtained by touching any place on a screen. In the aspect of representing the three-dimensional scene of the house, first, a house can be scanned and captured from multiple points at multiple angles, to obtain complete three-dimensional point cloud data, longitude and latitude data, and multi-exposure high-definition colored pictures. Later on, all data and image textures are mapped onto a three-dimensional model through three-dimensional reconstruction technologies such as automatic modeling, intelligent hole filling, full-automatic data extraction, and High-Dynamic Range (HDR) image optimization, to obtain a final real house space viewed by users.

Figure 1:
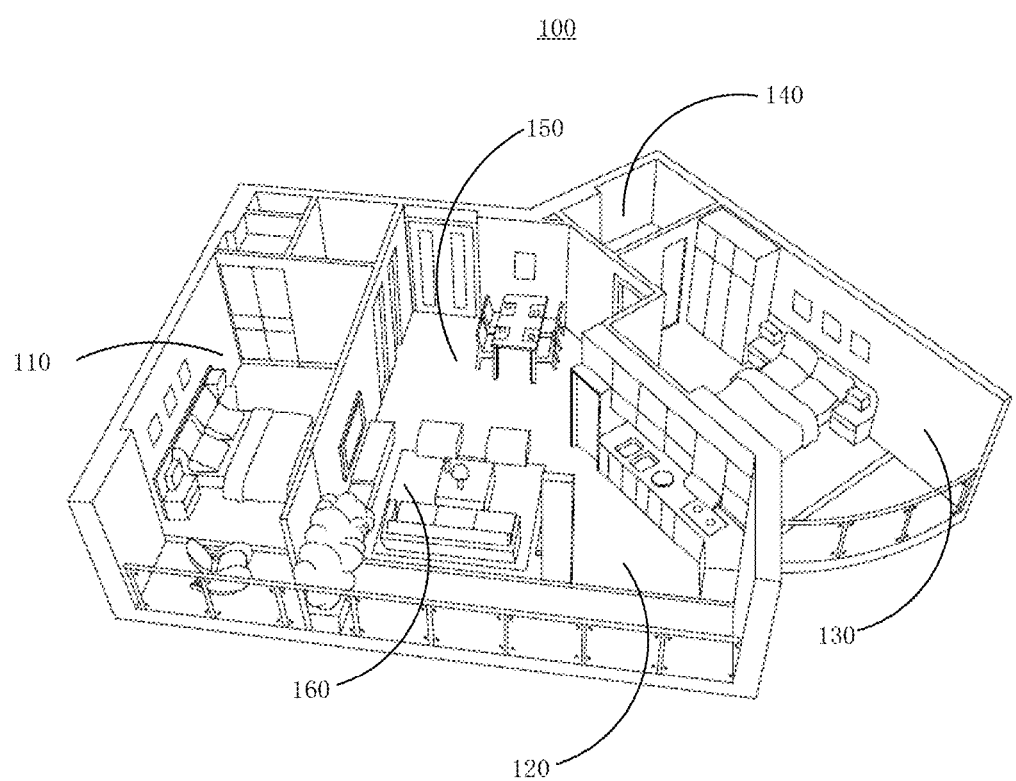
- FIG. 1 illustrates an exemplary three-dimensional (3D) VR environment, according to embodiments of the disclosure.

FIG. 1 illustrates an exemplary 3D VR environment 100, according to embodiments of the disclosure. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some cases, a functional space may correspond to an enclosed or partially enclosed space within or adjacent to a room. For example, functional space 140 may correspond to a closet. In some cases, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
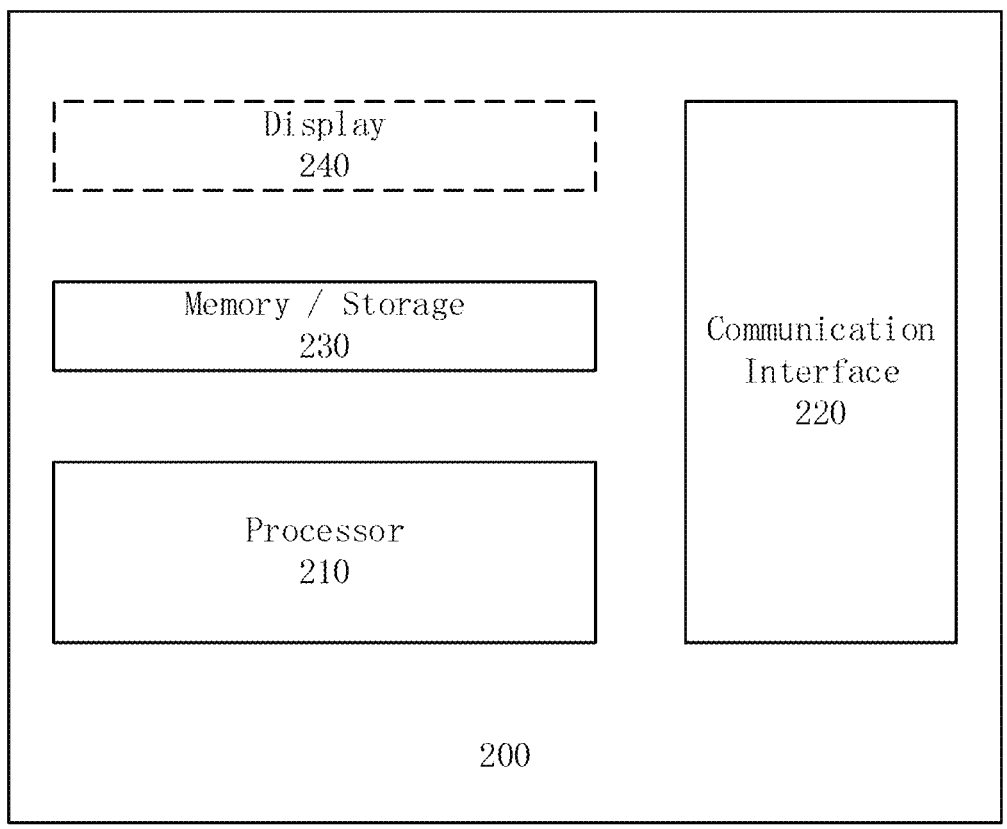
FIG. 2 illustrates a block diagram of an exemplary computer system configured to provide, display, or enrich an in-door VR tour, according to embodiments of the disclosure.

FIG. 2 illustrates a block diagram of an exemplary computer system 200 configured to implement various functions disclosed herein. For example, computer system 200 may be configured as a server to create or reconstruct VR environment 100. In another example, computer system 200 may be configured as terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to per various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 210 may be configured to per the operations in accordance with the instructions stored in memory 230. Processor 210 may include any appropriate type of general-purpose or special-purpose microprocessor, digital signal processor, microcontroller, or the like. Processor 210 may be configured as a separate processor module dedicated to performing one or more specific operations disclosed herein. Alternatively, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to terminal a device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience.

For example, VR environment 100 may be displayed on display 240. In some embodiments, display 240 may be integrated as part of communication interface 220.

Figure 3:
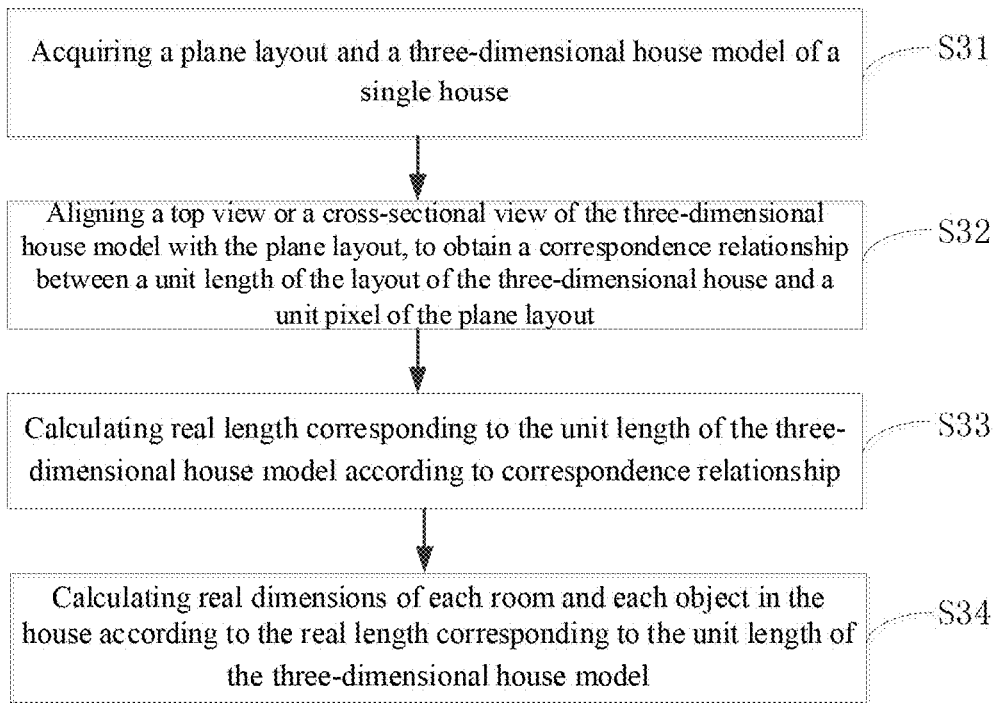
FIG. 3 is a flow diagram of a method for automatically generating a relevant dimension in a virtual three-dimensional house model according to a first embodiment of the present invention.

FIG. 3 shows a flow diagram of a method for automatically generating a spatial size in a three-dimensional house model according to a first embodiment of the present invention.

As shown in FIG. 3, the method for automatically generating a spatial size in a three-dimensional house model according to the first embodiment of the present invention specifically includes following steps:

In step S31, a plane layout and a three-dimensional house model of a single house are acquired;

Specifically, the three-dimensional house model proposed in the first embodiment of the present invention is real simulation of full view of a house. In a conventional three-dimensional house model, a user can enter a virtual three-dimensional space to know a house type and layout, but this three-dimensional house model cannot visually provide dimensions of each room or dimensions of each piece of furniture and object in the room. In the first embodiment of the present invention, dimensions of the three-dimensional house model are calculated through dimensional information in the plane layout, where the plane layout is a manually drawn layout now available, and all manually drawn layouts are marked with corresponding dimensions.

In step S32, a top view or a cross-sectional view of the three-dimensional house model is aligned with the plane layout to obtain a correspondence relationship between a unit length of the three-dimensional house model and a unit pixel of the plane layout;

Specifically, the top view of the three-dimensional house model is generally corresponding to the plane layout of the house. If the house has more than one floor or not all layouts of floors can be obtained from the top view, horizontal cross-sectional views of the three-dimensional house model can be cut out as plane layouts of respective floors of the house.

The top view or the horizontal cross-sectional view obtained in the first embodiment of the present invention is zoomed proportionally such that, when dragged onto the house layout, the top view or the horizontal cross-sectional view can be at least substantially or completely aligned with the layout, thus a correspondence relationship of the unit pixels in the plane layout and a unit length of the three-dimensional house model can be obtained, i.e. how much pixels in the plane layout are corresponding to a unit length of the three-dimensional house model.

In step S33, a real length corresponding to the unit length of the three-dimensional house model is calculated according to correspondence relationship;

Specifically, the pixel dimension of a current layout and a marked real dimension have an explicit proportional relationship, for example, one pixel in the layout is corresponding to 25 mm. Therefore, after the proportional relationship between the unit length of the three-dimensional house model and the unit pixel of the plane layout is obtained, a proportional relationship between the unit length of the three-dimensional house model and the real length of an actual space can be obtained.

It should be indicated that the real length/dimension of the space or object mentioned in the present disclosure is obtained from calculation, aiming at indicating an actual length of the space or object in a practical environment. Therefore, the real length/dimension obtained from calculation should be a value equivalent or approximate to a length/dimension actually measured in the practical environment.

In step S34, real dimensions of each room and each object in the house are calculated according to the real length corresponding to the unit length of the three-dimensional house model;

Specifically, after the proportional relationship between the unit length of the three-dimensional house model and the real length of the actual space is obtained, the real dimensions of each room and each object in the three-dimensional model can be calculated respectively, such that dimensional information on each object can be automatically generated in the three-dimensional house model, without manual marking. It is easy to understand that in practical application, it is feasible to merely calculate the real dimensions of an interested room and/or object. For example, in a case where a user only wants to know dimensions of a living room and furniture in the living room, it is unnecessary to calculate real dimensions of other rooms (for example, kitchen) or objects, thus saving calculation resources.

With the method for automatically generating a spatial size in a three-dimensional house model provided in the embodiment of the present invention, the correspondence relationship between the unit length of the three-dimensional house model and the real length is obtained by aligning the top view or the cross-sectional view of the three-dimensional house model with the plane layout, so as to calculate the real dimensions of each room and each object in the three-dimensional house model. Therefore, the dimensions of each room and each object can be automatically generated in the three-dimensional house model, without manual marking, which is convenient and efficient.

Based on the above embodiment, step S32 specifically includes:

zooming the three-dimensional house model, from an angle of the top view or the cross-sectional view, to a same dimension as the plane layout; and obtaining a ratio of the unit length of the three-dimensional house model to the unit pixel of the plane layout as a first numerical value.

Specifically, after the top view or the cross-sectional view of the three-dimensional house model is aligned with the plane layout, the proportional relationship between the unit length of the three-dimensional house model and the unit pixel of the plane layout can be calculated. For example, if five unit lengths of the three-dimensional house model are equal to the dimension of 300 pixels, the ratio of the unit length of the three-dimensional house model to the unit pixel of the plane layout, i.e. the first numerical value, is 60.

Based on the above embodiment, step S33 specifically includes:

calculating a product of the real length corresponding to the unit pixel of the plane layout and the first numerical value, to obtain the real length corresponding to the unit length of the three-dimensional house model.

Specifically, according to the above example, one pixel in the layout is corresponding to 25 mm in the actual space, and the first numerical value is 60, that is, one unit length of the three-dimensional model is equal to 60 pixels, then the real length corresponding to the unit length of the three-dimensional house model is 1500 mm, i.e. 1.5 m, obtained by multiplying 25 mm by 60.

Based on the above embodiment, step S34 specifically includes:

calculating a product of the number of unit length of the three-dimensional house model occupied by length, width, and height of each room and each object and the real length corresponding to the unit length, to obtain real length, width, and height of each room and each object respectively.

Specifically, after it is determined that one unit of the three-dimensional house model is equal to 1.5 m in the actual space, corresponding real dimensions can be directly obtained according to the number of units occupied by the length, width, and height of each room and each object in the three-dimensional house model.

Based on the above embodiment, after step S34, the method further includes:

presenting, after choosing each room and object in the three-dimensional house model, real length, width, and height of the chosen room or object.

Specifically, after the real dimensions of each room and each object are automatically generated in the three-dimensional house model, they can be used for front-end display, i.e. client display.

Figure 4:
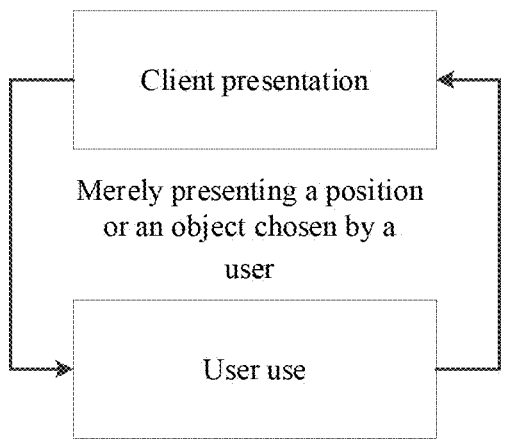
FIG. 4 schematically shows a schematic diagram with dimensional information on a chosen object or room being presented.

FIG. 4 shows a schematic diagram with dimensional information being presented in the three-dimensional house model.

Referring to FIG. 4, for client presentation, in order not to interfere with an interface a user uses, not all pieces of dimensional information of the object are presented. The user can choose the object's dimension desired to be presented in a using process, and after the choosing, only the chosen object's dimension is presented in the three-dimensional house model.

Figure 5:
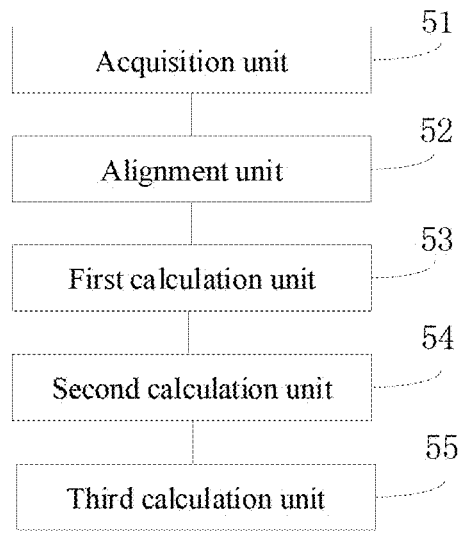
FIG. 5 schematically shows a structural schematic diagram of an apparatus for calculating a relevant dimension in a virtual three-dimensional house model.

FIG. 5 shows a structural schematic diagram of an apparatus for automatically generating a spatial size in a three-dimensional house model provided in the present disclosure.

As shown in FIG. 5, the apparatus for automatically generating a spatial size in a three-dimensional house model provided in the present disclosure includes an acquisition unit 51, an alignment unit 52, a first calculation unit 53, a second calculation unit 54, and a third calculation unit 55, wherein the acquisition unit 51 can acquire a plane layout and a three-dimensional house model of a single house;

the alignment unit 52 can align a top view or a cross-sectional view of the three-dimensional house model with the plane layout;

the first calculation unit 53 can calculate a correspondence relationship between a unit length of the three-dimensional house model and a unit pixel of the plane layout;

the second calculation unit 54 can calculate a real length corresponding to the unit length of the three-dimensional house model according to the correspondence relationship; and the third calculation unit 55 can calculate a real dimension of each room and each object in the house according to the real length corresponding to the unit length of the three-dimensional house model.

With the apparatus for automatically generating a spatial size in a three-dimensional house model provided in the present disclosure, the correspondence relationship between the unit length of the three-dimensional house model and the real length is obtained by aligning the top view or the cross-sectional view of the three-dimensional house model with the plane layout, so as to calculate the real dimensions of each room and each object in the three-dimensional house model. Therefore, the dimensions of each room and each object can be automatically generated in the three-dimensional house model, without manual marking, which is convenient and efficient.

Based on the above embodiment, the alignment unit 52 can zoom the three-dimensional house model, from an angle of the top view or the cross-sectional view, to a same dimension as the plane layout.

The first calculation unit 53 can be configured to calculate a ratio of the unit length of the three-dimensional house model to the unit pixel of the plane layout to obtain a first numerical value.

The second calculation unit 54 can be configured to calculate a product of the real length corresponding to the unit pixel of the plane layout and the first numerical value, to obtain the real length corresponding to the unit length of the three-dimensional house model.

The third calculation unit 55 can be configured to calculate a product of the number of unit length of the three-dimensional house model occupied by length, width, and height of each room and each object and the real length corresponding to the unit length, to obtain real length, width, and height of each room and each object respectively.

Based on the above embodiment, the apparatus further includes:

a presentation unit, which can be configured to present, after choosing each room and object in the three-dimensional house model, real length, width, and height of the chosen room or object.

For client presentation, in order not to interfere with an interface a user uses, not all pieces of dimensional information of the object are presented. The user can choose the object's dimension desired to be presented in a using process, and after the choosing, only the chosen object's dimension is presented in the three-dimensional house model. Therefore, the user experience is improved.

Relevant functional modules in the present disclosure can be implemented with hardware processors, which will not be redundantly described herein.

The apparatus embodiment described above is merely illustrative, in which units described as separate parts may be or may be not physically separated, parts displayed or presented as units may be or may be not physical units, that is, they may be located in a single place, and also may be distributed on multiple network units. For example, the presentation unit may be realized by a display of a user terminal that is used for displaying. Partial or all modules therein may be selected, as actually required, to achieve the object of the solution of the present embodiment. Those ordinarily skilled in the art could understand and implement the present embodiment without using creative effort.

The present disclosure further provides an electronic device, including a memory, a processor, and a computer program stored on the memory and executable on the processor, wherein the method as in FIG. 3 is implemented when the processor executes the program.

Besides, some VR house viewing systems ignore factors such as changes of viewing angle of an image, but display to users the spatial size markings of a real house all the time. With changes of viewing angle of an image, however, such manner of displaying the spatial size markings fails to intuitively and clearly indicate the spatial sizes of the real house, and makes the spatial size markings in the house image excessively disordered.

Figure 6:
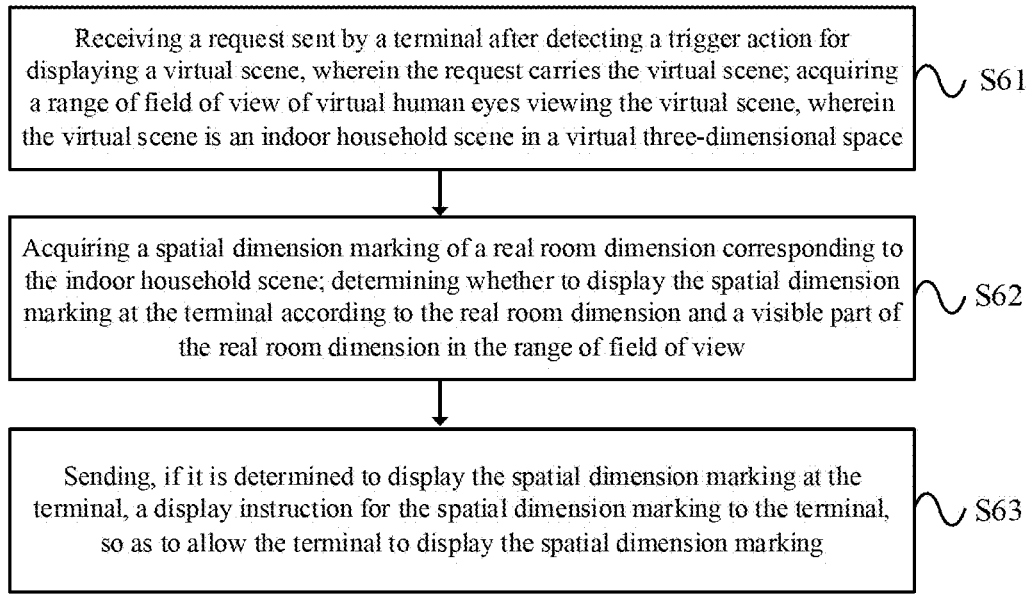
FIG. 6 is a flow diagram of a method for displaying a spatial size marking in a virtual three-dimensional house model according to a second embodiment of the present invention.

FIG. 6 is a flow diagram of a method for displaying a spatial size marking in a virtual three-dimensional space according to a second embodiment of the present invention. The method may include following steps:

In step S61, a request sent by a terminal after detecting a trigger action for displaying a virtual scene is received, wherein the request carries information on the virtual scene; a range of field of view of virtual human eyes viewing the virtual scene is acquired, wherein the virtual scene is an indoor household scene in a virtual three-dimensional space.

Specifically, an apparatus communicating with the terminal receives the request sent by the terminal after detecting the trigger action for displaying the virtual scene, wherein the request carries information on the virtual scene, for example, an ID capable of locating the virtual scene, and acquires the range of field of view of virtual human eyes viewing the virtual scene, wherein the virtual scene is the indoor household scene in the virtual three-dimensional space, and wherein the apparatus may be an enterprise business server applying VR, but is not specifically defined.

The terminal may be a terminal installed with a computer application program APP relevant to enterprise business, for example, a cellphone, a desktop computer, and a tablet computer etc. The APP has a button which can be triggered by a user. After the user triggers the button, a virtual scene relevant to the enterprise business is displayed to the user using the VR technology. For example, a real estate agency develops an APP that can display houses to users. The virtual scene is an indoor household scene simulating that the user views the house on site. The trigger action may be an action of clicking a terminal screen of the terminal and so on. The virtual human eyes may be construed to simulate eyes of a user himself/herself displayed at the terminal, wherein the virtual human eyes can move dynamically, and the range of field of view of the virtual human eyes can be construed as a fan-shaped area that can be seen by a line of sight of the user when the user is personally in the indoor household scene of the house viewed. A method for acquiring the range of field of view is a mature technology in the art, and will not be described redundantly.

In step S62, a spatial size marking of a real room dimension corresponding to the indoor household scene is acquired; whether to display the spatial size marking at the terminal is determined according to the real room dimension and a visible part of the real room dimension in the range of field of view.

The spatial size marking of the real room dimension corresponding to the indoor household scene can be acquired by the method according to the first embodiment of the present invention on the basis of a layout corresponding to the indoor household scene.

Optionally, in step S61, the request farther may carry the spatial size marking acquired at the terminal, wherein the spatial size marking may be acquired by the terminal with the method in the preceding first embodiment according to the layout corresponding to the indoor household scene. Therefore, since the request already carries the spatial size marking, the spatial size marking does not need to be acquired after calculation in the apparatus in step S62.

Specifically, the apparatus acquires the spatial size marking of the real room dimension corresponding to the indoor household scene; whether the spatial size marking is displayed at the terminal is determined according to the real room dimension and the visible part of the real room dimension in the range of field of view. The real room dimension may include at least one of length, width, and height of the real room. For determining whether to display the spatial size marking at the terminal according to the real room dimension and the visible part of the real room dimension in the range of field of view, it is specifically illustrated as follows:

If a ratio of the real dimension corresponding to the visible pan to the real room dimension is greater than or equal to a preset ratio, it is determined to display the spatial size marking at the terminal.

Figure 7A:
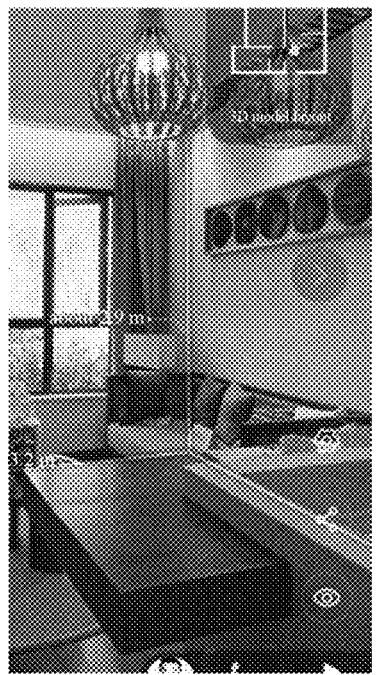
FIG. 7(a) schematically shows a screenshot of a virtual three-dimensional house model with a room height marking being displayed.

FIG. 7(a) is a screenshot with a room height marking being displayed in a virtual three-dimensional space according to the second embodiment of the present invention. As shown in FIG. 7(a), a marked room height is 2.9 in (corresponding to room height among the real room dimensions).

The visible part is illustrated as follows: in FIG. 7(a), an intersection of a vertical line between an upper corner of wall and the floor, with a transverse mark of 3.2 m is recorded as point A, a point where the upper corner of wall is located is recorded as point B, then visible part of the room height in FIG. 7(a) is between A and B. Assume that a real dimension corresponding to this visible part is 1.5 m (which can be obtained from scale conversion), and assume that the preset ratio is 50%, then 1.5 m/2.9 m>50%, therefore, it is determined to display the spatial size marking at the terminal, that is, the marking "about 2.9 m" is displayed in FIG. 7(a).

If the ratio of the real dimension corresponding to the visible part to the real room dimension is smaller than the preset ratio, it is determined not to display the spatial size marking at the terminal.

Figure 7B:
FIG. 7(b) schematically shows a screenshot of the virtual three-dimensional house model without a room height marking being displayed.

FIG. 7(b) is a screenshot without the room height marking being displayed in the virtual three-dimensional space according to the second embodiment of the present invention.

As shown in FIG. 7(b), since the upper corner of wall is blocked by a ceiling lamp and curtains in the room in FIG. 7(b), a visible part is much less than that in FIG. 7(a). Assume that a real dimension corresponding to the visible part is 1 m, then 1 m/2.9 m<50%, therefore, it is determined not to display the spatial size marking at the terminal.

In step S63, if it is determined to display the spatial size marking at the terminal, a display instruction for the spatial size marking is sent to the terminal, so as to allow the terminal to display the spatial size marking.

Specifically, if determining to display the spatial size marking at the terminal, the apparatus sends the display instruction for the spatial size marking to the terminal, so as to allow the terminal to display the spatial size marking. It should be indicated that the terminal can acquire the room height 2.9 m among the above real room dimensions according to the layout corresponding to the indoor household scene.

With the method for displaying a spatial size marking in a virtual three-dimensional space provided in the second embodiment of the present invention, whether to display the spatial size marking of the real room dimension at the terminal is determined according to the real room dimension and the visible part of the real room dimension in the range of field of view, therefore, the spatial size marking can be displayed in a reasonable manner with changes of viewing angle of an image and so on, in order to more intuitively and more clearly indicate the spatial size of the real room, and improve immersive experience of the users.

Based on the above embodiment, the step of determining whether to display the spatial size marking at the terminal according to the real room dimension and the visible part of the real room dimension in the range of field of view includes:

if the ratio of the real dimension corresponding to the visible part to the real room dimension is greater than or equal to the preset ratio, it is determined to display the spatial size marking at the terminal.

Specifically, if judging and acquiring that the ratio of the real dimension corresponding to the visible part to the real room dimension is greater than or equal to the preset ratio, the apparatus determines to display the spatial size marking at the terminal.

With the method for displaying a spatial size marking in a virtual three-dimensional space provided in the present disclosure, when the condition that the ratio of the real dimension corresponding to the visible part to the real room dimension is greater than or equal to the preset ratio is met, the spatial size marking is displayed at the terminal, which can more intuitively and more clearly indicate the spatial size of the real room. Reference can be made to the above embodiment, and details will not be described redundantly.

Based on the above embodiment, the method further includes:

If the ratio of the real dimension corresponding to the visible part to the real room dimension is less than the preset ratio, it is determined not to display the spatial size marking at the terminal.

Specifically, if judging and acquiring that the ratio of the real dimension corresponding to the visible part to the real room dimension is less than the preset ratio, the apparatus determines not to display the spatial size marking at the terminal. Reference can be made to the above embodiment, and details will not be described redundantly.

With the method for displaying a spatial size marking in a virtual three-dimensional space provided in the present disclosure, when the condition that the ratio of the real dimension corresponding to the visible part to the real room dimension is less than the preset ratio is met, the spatial size marking is not displayed at the terminal, then unnecessary spatial size markings can be hidden in a room image.

Based on the above embodiment, the real room dimension includes at least one of length, width, and height of the real room.

Specifically, the real room dimension in the apparatus includes at least one of length, width, and height of the real room. Reference can be made to the above embodiment, and details will not be described redundantly.

With the method for displaying a spatial size marking in a virtual three-dimensional space provided in the present disclosure, the spatial sizes of the real room can be marked comprehensively by making dimension markings for the length, width, and height of the real room.

Based on the above embodiment, the method further includes:

receiving the request that further carries the spatial size marking acquired at the terminal.

Specifically, the apparatus receives the request that further carries the spatial size marking acquired at the terminal. Reference can be made to the above embodiment, and details will not be described redundantly.

With the method for displaying a spatial size marking in a virtual three-dimensional space provided in the present disclosure, the spatial size marking is acquired at the terminal, then it is unnecessary to acquire the spatial size marking in the apparatus, which can improve service efficiency of the apparatus.

Based on the above embodiment, the spatial size marking in the request is acquired by the terminal according to the layout corresponding to the indoor household scene.

Specifically, the spatial size marking in the request in the apparatus is acquired by the terminal according to the layout corresponding to the indoor household scene. Reference can be made to the above embodiment, and details will not be described redundantly.

With the method for displaying a spatial size marking in a virtual three-dimensional space provided in the present disclosure, the spatial size marking is acquired through the layout, and the spatial size marking can be simply and efficiently acquired.

Based on the above embodiment, the trigger action includes a clicking action on a display screen of the terminal, or a two-finger zooming operation, i.e. zooming a current display interface with two fingers to trigger display or not.

Specifically, the trigger action in the apparatus includes a clicking action on the display screen of the terminal. Reference can be made to the above embodiment, and details will not be described redundantly.

With the method for displaying a spatial size marking in a virtual three-dimensional space provided in the present disclosure, the trigger action for displaying the virtual scene can be effectively triggered through the clicking action on the display screen of the terminal.

Figure 8:
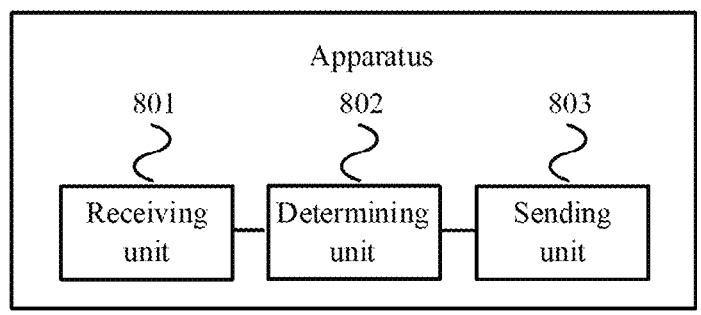
FIG. 8 schematically shows a structural schematic diagram of an apparatus for displaying a spatial size marking in a virtual three-dimensional house model.

FIG. 8 is a structural schematic diagram of an apparatus for displaying a spatial size marking in a virtual three-dimensional space. As shown in FIG. 8, an embodiment of the present invention provides an apparatus for displaying a spatial size marking in a virtual three-dimensional space, including a receiving unit 801, a determining unit 802, and a sending unit 803, wherein the receiving unit 801 can receive a request sent by a terminal after detecting a trigger action for displaying a virtual scene, wherein the request carries information on the virtual scene, and acquire a range of field of view of virtual human eyes viewing the virtual scene, wherein the virtual scene is an indoor household scene in a virtual three-dimensional space;

the determining unit 802 can acquire a spatial size marking of a real room dimension corresponding to the indoor household scene, and determine whether to display the spatial size marking at the terminal according to the real room dimension and a visible part of the real room dimension in the range of field of view;

the sending unit 803 can send, if it is determined to display the spatial size marking at the terminal, a display instruction for the spatial size marking to the terminal, so as to allow the terminal to display the spatial size marking.

Relevant functional modules in the present disclosure can be implemented with hardware processors, which will not be redundantly described herein.

With the apparatus for displaying a spatial size marking in a virtual three-dimensional space provided in the present disclosure, whether to display the spatial size marking of the real room dimension at the terminal is determined according to the real room dimension and the visible part of the real room dimension in the range of field of view, thus the spatial size marking can be displayed in a reasonable manner with changes of viewing angle of an image and so on, so as to more intuitively and more clearly indicate the spatial size of the real room, and improve immersive experience of the users.

The apparatus embodiment described above is merely illustrative, in which units described as separate parts may be or may be not physically separated, parts displayed or presented as units may be or may be not physical units, that is, they may be located in a single place, and also may be distributed on multiple network units. For example, the presentation unit may be realized by a display of a user terminal that is used for displaying. Partial or all modules therein may be selected, as actually required, to achieve the object of the solution of the present embodiment. Those ordinarily skilled in the art could understand and implement the present embodiment without using creative effort.

Figure 9:
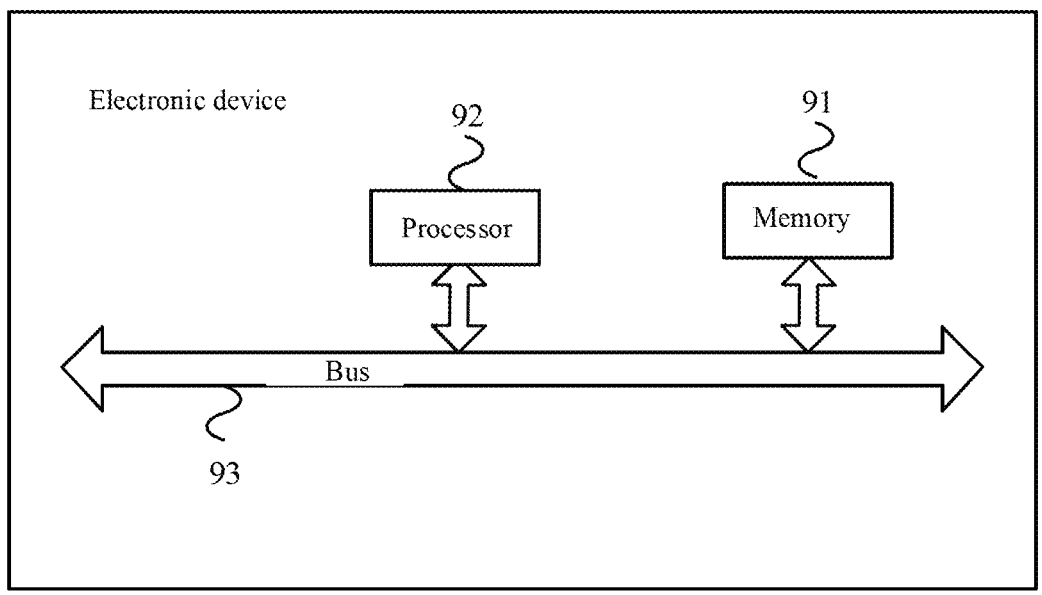
FIG. 9 shows a structural block diagram of an exemplary electronic device applicable to exemplary embodiments.

FIG. 9 shows a structural block diagram of an exemplary electronic device applicable to exemplary embodiments.

As shown in FIG. 9, the electronic device provided in the present disclosure may include a memory 91, a processor 92, a bus 93, and a computer program stored on the memory 91 and executable on the processor 92, wherein the memory 91 and the processor 92 communicate with each other through the bus 93, and the electronic device communicates with a user terminal non-wirelessly or wirelessly.

Wherein the processor 92 is configured to invoke a program instruction in the memory 91, so as to implement, when executing the program, the method provided in each method embodiment above.

The present disclosure further provides a non-transient computer readable storage medium, on which a computer program is stored, and the method provided in each method embodiment above is implemented when the program is executed by the processor.

The present disclosure further provides a computer program product, wherein the computer program product includes a computer program stored on a non-transient computer readable storage medium, the computer program includes a program instruction, and when the program instruction is executed by the computer, the computer can execute the method provided in each method embodiment above.

The embodiments described above for the electronic device and so on are merely illustrative, in which units described as separate pans may be or may be not physically separated, parts displayed as units may be or may be not physical units, that is, they may be located in a single place, and also may be distributed on multiple network units. Partial or all modules therein may be selected, as actually required, to achieve the object of the solution of the present embodiment. Those ordinarily skilled in the art could understand and implement the present embodiment without using creative effort.

Those skilled in the art could understand that although some embodiments described herein include certain features rather than other features included in other embodiments, combination of features in different embodiments means falling within the scope of the present invention and formation of different embodiments.

From the above description of the embodiments, those skilled in the art could clearly know that each embodiment can be implemented by means of software and necessary general-purpose hardware platform, and of course also can be implemented by hardware. Based on such understanding, the above technical solutions essentially or the part making contribution to the prior art can be embodied in a form of software product, and this computer software product can be stored in a computer readable storage medium, for example, ROM/RAM, diskette, and compact disk etc., which includes several instructions used to make a computer device (which may be a personal computer, a server or a network apparatus etc.) execute the method described in each embodiment or in certain parts of the embodiments, and so on.

Finally, it should be indicated that the above embodiments are merely used to illustrate the technical solutions of the present invention, rather than limiting the present invention. While the detailed description is made to the present invention with reference to the preceding embodiments, those ordinarily skilled in the art should understand that the technical solutions recited in the preceding embodiments still can be modified, or equivalent substitutions can be made to some of the technical features therein; and these modifications or substitutions do not make corresponding technical solutions essentially depart from the spirit and scope of the technical solutions of various embodiments of the present invention.

In a first aspect: a method for automatically generating a spatial size in a three-dimensional house model is provided, wherein the method includes: acquiring a plane layout and a three-dimensional house model of a single house; aligning a top view or a cross-sectional view of the three-dimensional house model with the plane layout to obtain a correspondence relationship between a unit length of the three-dimensional house model and a unit pixel of the plane layout; calculating a real length corresponding to the unit length of the three-dimensional house model according to the correspondence relationship; and calculating real dimensions of each room and each object in the house according to the real length corresponding to the unit length of the three-dimensional house model.

In a second aspect: according to the method of the first aspect, wherein the step of aligning a top view or a cross-sectional view of the three-dimensional house model with the plane layout includes: zooming the three-dimensional house model, from an angle of the top view or the cross-sectional view, to a same dimension as the plane layout; and the step of obtaining a correspondence relationship between a unit length of the three-dimensional house model and a unit pixel of the plane layout includes: obtaining a ratio of the unit length of the three-dimensional house model to the unit pixel of the plane layout as a first numerical value.

In a third aspect: according to the method of the second aspect, wherein the step of calculating a real length corresponding to the unit length of the three-dimensional house model according to the correspondence relationship includes: calculating a product of the real length corresponding to the unit pixel of the plane layout and the first numerical value, to obtain the real length corresponding to the unit length of the three-dimensional house model.

In a fourth aspect: according to the method of the third aspect, wherein the step of calculating real dimensions of each room and each object in the house according to the real length corresponding to the unit length of the three-dimensional house model includes: calculating a product of the number of unit length of the three-dimensional house model occupied by length, width, and height of each room and each object and the real length corresponding to the unit length, to obtain real length, width, and height of each room and each object respectively.

In a fifth aspect: according to the method of the fourth aspect, wherein after the real length, width, and height of each room and each object are calculated, the method further includes: presenting, after choosing each room and object in the three-dimensional house model, real length, width, and height of the chosen room or object.

In a sixth aspect: an apparatus for automatically generating a spatial size in a three-dimensional house model is provided, wherein the apparatus includes an acquisition unit, configured to acquire a plane layout and a three-dimensional house model of a single house; an alignment unit, configured to align a top view or a cross-sectional view of the three-dimensional house model with the plane layout; a first calculation unit, configured to calculate a correspondence relationship between a unit length of the three-dimensional house model and a unit pixel of the plane layout; a second calculation unit, configured to calculate a real length corresponding to the unit length of the three-dimensional house model according to the correspondence relationship; and a third calculation unit, configured to calculate a real dimension of each room and each object in the house according to the real length corresponding to the unit length of the three-dimensional house model.

In a seventh aspect: according to the apparatus of the sixth aspect, wherein the alignment unit is configured to zoom the three-dimensional house model, from an angle of the top view or the cross-sectional view, to a same dimension as the plane layout; and the first calculation unit is configured to calculate a ratio of the unit length of the three-dimensional house model to the unit pixel of the plane layout to obtain a first numerical value.

In an eighth aspect: according to the apparatus of the seventh aspect, wherein the second calculation unit is configured to calculate a product of the real length corresponding to the unit pixel of the plane layout and the first numerical value, to obtain the real length corresponding to the unit length of the three-dimensional house model.

In a ninth aspect: an electronic device is provided, including a memory, a processor, and a computer program stored on the memory and executable on the processor, wherein the steps of automatically generating a spatial size in a three-dimensional house model as in any one of the first to fifth aspects are implemented when the processor executes the program.

In a tenth aspect: a non-transient computer readable storage medium is provided, on which a computer program is stored, wherein the steps of automatically generating a spatial size in a three-dimensional house model as in any one of the first to fifth aspects are implemented when the computer program is executed by the processor.

In an $11^{th}$ aspect: a method for displaying a spatial size marking in a virtual three-dimensional space is provided, including:

receiving a request sent by a terminal after detecting a trigger action for displaying a virtual scene, wherein the request carries the virtual scene; acquiring a range of field of view of virtual human eyes viewing the virtual scene, wherein the virtual scene is an indoor household scene in a virtual three-dimensional space;

acquiring a spatial size marking of a real room dimension corresponding to the indoor household scene; determining whether to display the spatial size marking at the terminal according to the real room dimension and a visible part of the real room dimension in the range of field of view;

if it is determined to display the spatial size marking at the terminal, a display instruction for the spatial size marking is sent to the terminal, so as to allow the terminal to display the spatial size marking.

In a $12^{th}$ aspect: according to the method of the aspect, wherein the step of determining whether to display the spatial size marking at the terminal according to the real room dimension and a visible part of the real room dimension in the range of field of view includes: determining, if a ratio of the real dimension corresponding to the visible part to the real room dimension is greater than or equal to a preset ratio, to display the spatial size marking at the terminal.

In a $13^{th}$ aspect: according to the method of the $12^{th}$ aspect, wherein the method further includes: determining, if the ratio of the real dimension corresponding to the visible part to the real room dimension is smaller than the preset ratio, not to display the spatial size marking at the terminal.

In a $14^{th}$ aspect: according to the method of the $11^{th}$ aspect, wherein the real room dimension includes at least one of length, width, and height of the real room.

In a $15^{th}$ aspect: according to the method of any one of the $11^{th}$ to $14^{th}$ aspects, wherein the method further includes: receiving the request, wherein the request further carries the spatial size marking acquired at the terminal.

In a $16^{th}$ aspect: according to the method of $15^{th}$ aspect, wherein the spatial size marking in the request is acquired by the terminal according to the layout corresponding to the indoor household scene.

In a $17^{th}$ aspect: according to the method any one of the $11^{th}$, $12^{th}$, $13^{th}$, $14^{th}$, $16^{th}$, and $17^{th}$ aspects, wherein the trigger action includes a clicking action on a display screen of the terminal.

In an $18^{th}$ aspect: an apparatus for displaying a spatial size marking in a virtual three-dimensional space is provided, including: a receiving unit, configured to receive a request sent by a terminal after detecting a trigger action for displaying the virtual scene, wherein the request carries the virtual scene, and acquire a range of field of view of virtual human eyes viewing the virtual scene, wherein the virtual scene is an indoor household scene in the virtual three-dimensional space; a determining unit, configured to acquire a spatial size marking of a real room dimension corresponding to the indoor household scene, and determine whether to display the spatial size marking at the terminal according to the real room dimension and a visible part of the real room dimension in the range of field of view; and a sending unit, configured to send, if it is determined to display the spatial size marking at the terminal, a display instruction for the spatial size marking to the terminal, so as to allow the terminal to display the spatial size marking.

In a $19^{th}$ aspect: an electronic device is provided, including a processor, a memory, and a bus, wherein the processor and the memory communicate with each other through the bus, the memory stores a program instruction executable by the processor, and the processor, invoking the program instruction, can implement the method as in any one of the $11^{th}$ to $17^{th}$ aspects.

In a 20th aspect: a non-transient computer readable storage medium is provided, wherein a computer instruction is stored in the non-transient computer readable storage medium, and the computer instruction enables a computer to implement the method as in any one of the 11th to 17th aspects.

What is claimed is:

1. A method for displaying a spatial size marking of a real room dimension in a virtual three-dimensional house model, comprising:
receiving a request sent by a terminal after detecting a trigger action for displaying a virtual scene, wherein the request carries information on the virtual scene, and wherein the virtual scene is an indoor scene in the virtual three-dimensional house model;
acquiring a range of field of view of virtual human eyes viewing the virtual scene;
acquiring a real room dimension corresponding to the indoor scene;
determining whether to display a spatial size marking at the terminal according to the real room dimension and a visible part of the real room dimension in the range of field of view, wherein the spatial size marking is corresponding to the real room dimension; and
sending, when it is determined to display the spatial size marking at the terminal, a display instruction for the spatial size marking to the terminal, so as to allow the terminal to display the spatial size marking; and
wherein the real room dimension is determined through following steps:
acquiring a plane layout of a real house corresponding to the virtual three-dimensional house model;
aligning a top view or a cross-sectional view of the virtual three-dimensional house model with the plane layout to obtain a correspondence relationship between a unit length of the virtual three-dimensional house model and a unit pixel of the plane layout,
calculating a real length corresponding to the unit length of the virtual three-dimensional house model according to the correspondence relationship; and
calculating a real dimension of a room and an object in the real house according to the real length corresponding to the unit length of the virtual three-dimensional house model;
wherein the step of aligning a top view or a cross-sectional view of the virtual three-dimensional house model with the plane layout comprises zooming the virtual three-dimensional house model, from an angle of the top view or the cross-sectional view, to the same dimension as the plane layout; and wherein the step of obtaining a correspondence relationship between a unit length of the virtual three-dimensional house model and a unit pixel of the plane layout comprises obtaining a ratio of the unit length of the virtual three-dimensional house model to the unit pixel of the plane layout as a first numerical value; and
wherein the step of calculating a real length corresponding to the unit length of the virtual three-dimensional house model according to the correspondence relationship comprises calculating a product of the real length corresponding to the unit pixel of the plane layout and the first numerical value, to obtain the real length corresponding to the unit length of the virtual three-dimensional house model.

2. The method according to claim 1, wherein the step of calculating a real dimension of a room and an object in the real house according to the real length corresponding to the unit length of the virtual three-dimensional house model comprises:
calculating a product of the number of unit length of the virtual three-dimensional house model occupied by length, width, and height of the room and the object and the real length corresponding to the unit length, to obtain real length, width, and height of the room and the object respectively.

3. The method according to claim 2, wherein after the real length, width, and height of the room and the object are calculated, the method further comprises:
presenting, after choosing the room and the object in the virtual three-dimensional house model, real length, width, and height of the chosen room and object.

4. The method according to claim 1, wherein the step of determining whether to display a spatial size marking of the real room dimension at the terminal according to the real room dimension and a visible part of the real room dimension in the range of field of view comprises:
determining, if a ratio of the real dimension corresponding to the visible part to the real room dimension is greater than or equal to a preset ratio, to display the spatial size marking at the terminal.

5. The method according to claim 4, wherein the method further comprises:
determining, if the ratio of the real dimension corresponding to the visible part to the real room dimension is smaller than the preset ratio, not to display the spatial size marking at the terminal.

6. The method according to claim 1, wherein the real room dimension comprises:
at least one of length, width, and height of the real room.

7. The method according to claim 1, wherein the trigger action comprises a clicking action on a display screen of the terminal or a two-finger zooming operation.

8. The method according to claim 1, the method further includes:
receiving the request which further carries the spatial size marking acquired at the terminal.

9. The method according to claim 8, wherein the spatial size marking in the request is acquired by the terminal according to the plane layout corresponding to the indoor scene.

10. An electronic device, characterized in that the electronic device comprises: a processor, a memory, and a bus, wherein,
the processor and the memory are configured to communicate with each other through the bus;
the memory is configured to store a program instruction executable by the processor, and the processor, invoking the program instruction, is capable of implementing following steps:
receiving a request sent by a terminal after detecting a trigger action for displaying a virtual scene, wherein the request carries information on the virtual scene, and wherein the virtual scene is an indoor scene in the virtual three-dimensional house model;
acquiring a range of field of view of virtual human eyes viewing the virtual scene;
acquiring a real room dimension corresponding to the indoor scene;
determining whether to display a spatial size marking at the terminal according to the real room dimension and a visible part of the real room dimension in the range of field of view, wherein the spatial size marking is corresponding to the real room dimension; and sending, when it is determined to display the spatial size marking at the terminal, a display instruction for the spatial size marking to the terminal, so as to allow the terminal to display the spatial size marking; and wherein the real room dimension is determined through following steps:

acquiring a plane layout of a real house corresponding to the virtual three-dimensional house model;

aligning a top view or a cross-sectional view of the virtual three-dimensional house model with the plane layout to obtain a correspondence relationship between a unit length of the virtual three-dimensional house model and a unit pixel of the plane layout, calculating a real length corresponding to the unit length of the virtual three-dimensional house model according to the correspondence relationship; and calculating a real dimension of a room and an object in the real house according to the real length corresponding to the unit length of the virtual three-dimensional house model;

wherein the step of aligning a top view or a cross-sectional view of the virtual three-dimensional house model with the plane layout comprises zooming the virtual three-dimensional house model, from an angle of the top view or the cross-sectional view, to the same dimension as the plane layout; and wherein the step of obtaining a correspondence relationship between a unit length of the virtual three-dimensional house model and a unit pixel of the plane layout comprises obtaining a ratio of the unit length of the virtual three-dimensional house model to the unit pixel of the plane layout as a first numerical value; and wherein the step of calculating a real length corresponding to the unit length of the virtual three-dimensional house model according to the correspondence relationship comprises calculating a product of the real length corresponding to the unit pixel of the plane layout and the first numerical value, to obtain the real length corresponding to the unit length of the virtual three-dimensional house model.

11. The electronic device according to claim 10, wherein the step of calculating a real dimension of a room and an object-in the real house according to the real length corresponding to the unit length of the virtual three-dimensional house model comprises:

calculating a product of the number of unit length of the virtual three-dimensional house model occupied by length, width, and height of the room and the object- and the real length corresponding to the unit length, to obtain real length, width, and height of the room and the object respectively.

12. The electronic device according to claim 11, wherein after the real length, width, and height of the room and the object are calculated, the method further comprises:

presenting, after choosing the room and the object in the virtual three-dimensional house model, real length, width, and height of the chosen room and object.

13. The electronic device according to claim 10, wherein the step of determining whether to display a spatial size marking of the real room dimension at the terminal according to the real room dimension and a visible part of the real room dimension in the range of field of view comprises:

determining, if a ratio of the real dimension corresponding to the visible part to the real room dimension is greater than or equal to a preset ratio, to display the spatial size marking at the terminal; and determining, if the ratio of the real dimension corresponding to the visible part to the real room dimension is smaller than the preset ratio, not to display the spatial size marking at the terminal.

14. A non-transitory computer readable storage medium, wherein the non-transitory computer readable storage medium stores a computer instruction, and the computer instruction enables a computer to implement the method of claim 1.

* * * * *